March 27, 1951 P. H. HAMILTON 2,546,501
CAN HANDLING MACHINE
Filed Aug. 13, 1945

INVENTOR.
PERRY H. HAMILTON,
BY
ATTORNEYS.

Patented Mar. 27, 1951

2,546,501

UNITED STATES PATENT OFFICE 2,546,501

CAN HANDLING MACHINE

Perry H. Hamilton, Columbus, Ind.

Application August 13, 1945, Serial No. 610,607

10 Claims. (Cl. 226—16)

In packing plants where food is canned, it is customary in many instances to seal each filled can and then to place a number of such cans in a kettle and subject them to further cooking or to sterilization by heat. In order to conserve space in the kettle it is customary to arrange the cans in the kettle by hand according to a predetermined plan. When the cans to be thus arranged are hot, as is frequently the case, filling the kettles is an unpleasant operation and one which can be performed only with some difficulty.

It is the object of my invention to provide can-feeding mechanism by which the hot cans can be properly arranged in the kettle to conserve space therein. More specifically, it is my object to produce can-conveying and can-positioning mechanism which will make it unnecessary for an operator to handle the cans himself. A further object of my invention is to provide a mechanism which will receive the cans as they are fed continuously from the sealing machine and which will continuously deposit the cans in the proper position within the kettle.

In carrying out my invention, I provide a generally helical chute having at its lower end a discharge opening and at its upper end a generally horizontal portion adapted to receive cans fed from the sealing machine. The helical portion of the chute is positioned above a horizontal turntable which is mounted for vertical movement and for rotation about a vertical axis. Power-operated means are provided for rotating the turn-table, whereby a cylindrical kettle on the turn-table can be rotated as cans are fed from the chute on to the kettle-bottom and against the side wall of the kettle to become arranged in an annular series. The horizontal chute-portion is pivoted on a vertical axis so that by swinging the chute additional annular series of cans may be formed in succession on the kettle-bottom and within the first series. Means are provided for controlling the vertical position of the table, so that after the bottom of the kettle is covered by the first layer of cans succeeding layers can be deposited until the kettle is full.

Figure 1:
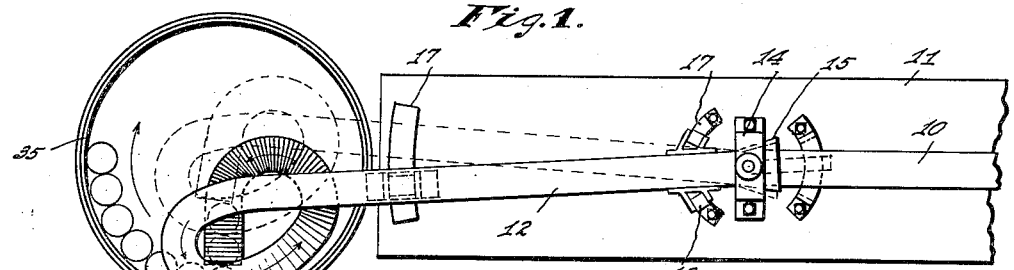
Figure 2:
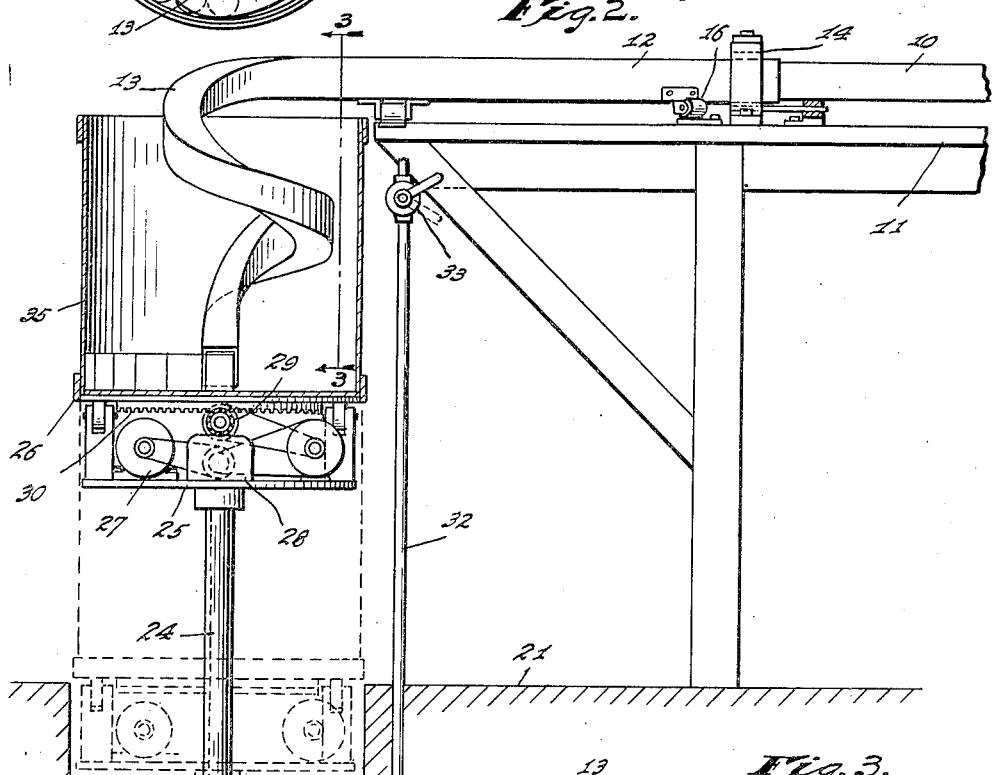
Figure 3:
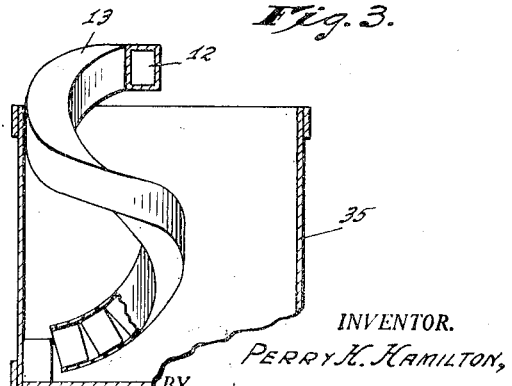

The accompanying drawing illustrates my invention: Fig. 1 is a plan view of the apparatus; Fig. 2 is a side elevation with parts of the apparatus shown in section; and Fig. 3 is a section on the line 3—3 of Fig. 2.

In the device shown in the drawing it is assumed that the sealed cans ready for deposit in the kettle will be fed from the sealing machine (not shown) through a horizontal conduit 10 rigidly mounted on a table 11. The discharge end of the conduit 10 is received within the end of a horizontal portion 12 of a feeding chute 13. Secured to the table 11 adjacent the end of the conduit 10 is a bracket 14 to which the horizontal chute-portion 12 is pivoted on a vertical axis. The side walls of the chute-portion 12 are flared as indicated at 15 to permit angular movement of the chute about its axis of connection with the bracket 14. In order to avoid excessive loading of the pivotal connection between the chute-portion 12 and the bracket 14, the chute-portion may be provided with rollers 16 which roll on tracks 17 as the chute swings about its vertical axis.

Beyond the end of the table 11, and preferably in a pit 20 in the floor 21, I mount a vertical cylinder 22 containing a reciprocable piston 23 movable vertically with a piston rod 24 which extends upwardly from the cylinder. The upper end of the piston rod 24 supports a plate 25 upon which there is mounted a rotatable turn-table 26 and means for rotating it. Such means as shown, includes an electric motor 27, a variable speed transmission mechanism 28, and a pinion 29 which meshes with a ring-gear 30 on the bottom of the turn-table 26. A source of fluid under pressure is connected through a pipe 32 and a three-way valve 33 to the lower end of the cylinder 22 so that by the proper manipulation of the valve 33 fluid can alternatively be admitted to the lower end of the cylinder to raise the plate 25 and the parts carried thereby or exhausted from the cylinder to permit the plate 25 and the load upon it to descend under the influence of gravity.

Above the turn-table 26, the chute 13 has a general helical form sufficient in vertical extent to permit the lower end of the chute to reach the bottom of a kettle 35 disposed on the turn-table 26 while the horizontal portion 12 of the chute clears the upper edge of the kettle. As will be clear from the drawing, the lower end of the chute is arranged to discharge in a direction generally normal to the horizontal chute-portion 12 and generally radially of the kettle 35.

To use the apparatus, the table 25 is lowered to a position adjacent the floor 21, as shown in dotted lines, and a kettle 35 is placed on the table. In the lowered position of the turn-table 26, there is sufficient clearance between it and the lower end of the chute 13 to permit the kettle to be inserted. By operation of the valve 33, the table is then raised to the full-line position shown in which the lower end of the chute 13 will be only a slight distance above the bottom of the kettle. With the chute positioned as shown in full lines in Fig. 1, the turn-table is rotated by the motor 27 in the direction indicated by the arrow, and the cans are fed through the conduit 10 into the horizontal chute-portion 12. The cans move along the horizontal portion 12 under pressure exerted by the following cans until they reach the helically curved chute-portion down which they descend under the influence of gravity. The turn-table 26 is rotated at such a speed that the cans successively discharged from the lower end of the chute will lie substantially in contact with each other to form an annular series of cans in contact with the cylindrical wall of the kettle. When such series of cans is completed, the chute is moved inwardly of the kettle, by swinging it about its axis of mounting in the bracket 14 toward the dotted-line position shown in Fig. 1, so that cans discharged from the lower end of the chute will form a second annular series inside the first annular series deposited. This operation of forming successive and progressively smaller series of cans is continued as long as there is room for the lower end of the chute to be received within the innermost series, when the bottom of the kettle will be substantially covered with cans. The valve 33 is then operated to permit the plate 25 to descend for a distance equal to the height of the cans, whereupon the series of operations above described will be repeated to deposit a second layer of cans. The cans are thus deposited in successive layers until the kettle 35 is full, and the filled kettle is then removed from the turn-table 26 and an empty kettle put in its place for a second kettle-filling series of operations.

It is to be noted that the interior cross-sectional shape of the chute throughout its extent approximates the shape of each can in side elevation. As a result, adjacent cans are maintained approximately parallel to each other with their axes approximately normal to the top and bottom walls, and the cans slide through the chute without jamming. In the helical portion of the chute, some departure of adjacent cans from exact parallelism will necessarily occur, as will be clear from Fig. 3; but curvature of the chute in a plane normal to the top and bottom chute-walls should not be, and need not be, so abrupt as to permit any can to tilt and become wedged. The over-all horizontal dimensions of the helical chute-portion should of course be such as will permit the discharge opening of the chute to move radially, or generally radially, of the kettle for the required distance without interference from the side wall of the kettle.

I claim as my invention:

1. In apparatus of the type described, a turn-table adapted to support a kettle to be filled with cans, means supporting said turn-table for rotation about a vertical axis and for vertical movement, power-actuated means for rotating the turn-table and for controlling its elevation, a generally helical chute disposed above said turn-table, said chute being adapted to receive cans as its upper end and having a can-discharge opening at its lower end, and means supporting said chute for horizontal movement to vary the distance between the discharge opening and the axis of rotation of the turn-table.

2. In apparatus of the type described, a turn-table adapted to support a kettle to be filled with cans, means supporting said turn-table for rotation about a vertical axis and for vertical movement, means for varying the elevation of said turn-table, a generally helical chute disposed above said turn-table, said chute being adapted to receive cans at its upper end and having a can-discharge opening at its lower end, and means supporting said chute for horizontal movement to vary the distance between the discharge opening and the axis of rotation of the turn-table.

3. The invention set forth in claim 2 with the addition of a stationary can-conveying conduit, said chute being provided at its upper end with an integral horizontal extension having an inlet end disposed to receive cans from said conduit, and means pivotally supporting said chute-extension for swinging movement about a vertical axis adjacent its inlet end.

4. The invention set forth in claim 2 with the addition that said chute is provided at its upper end with an integral extension projecting horizontally beyond the limits of said turn-table and there having an inlet opening for cans, and means pivotally supporting said chute-extension for swinging movement about a vertical axis adjacent its inlet end.

5. The invention set forth in claim 2 with the addition that said chute is provided at its upper end with an integral extension projecting horizontally beyond the limits of said turn-table and there having an inlet opening for cans, and means pivotally supporting said chute-extension for swinging movement about a vertical axis displaced from the axis of the turn-table.

6. In can-handling apparatus, a turn-table adapted to support a kettle to be filled with cans, means supporting said turn-table for rotation about a vertical axis, a can-conveying chute having an inlet portion and a downwardly extending generally helical delivery portion, terminating in a can-discharge opening directed generally horizontally and outwardly with respect to the helix, means supporting movably said chute with its helical portion above said turn-table and radially movable with respect thereto, and means for varying the relative elevations of the turn-table and helical chute-portion.

7. In can-handling apparatus, a turn-table adapted to support a kettle to be filled with cans, means supporting said turn-table for rotation about a vertical axis, a can-conveying chute having a delivery portion located above said table and a receiving portion continuous with said delivery portion and extending laterally therefrom, said delivery portion extending generally downwardly from said receiving portion to enter a kettle on said table and having at its lower end a discharge opening directed radially outward with respect to said table, and means associated with the receiving portion of the chute for supporting the chute for horizontal movement to vary the distance between said discharge opening and the axis of said turn-table.

8. In can-handling apparatus, a turn-table adapted to support a kettle to be filled with cans, means supporting said turn-table for rotation about a vertical axis, a can-conveying chute including a delivery portion extending generally downwardly from a point above said turn-table to enter a kettle thereon, and means movably supporting said delivery portion to permit adjustment of its lower end generally radially of said table.

9. The invention set forth in claim 8 with the addition of means for rotating said table.

10. The invention set forth in claim 8 with the addition that said turn-table is vertically adjustable in its supporting means, and means for holding said turn-table at any of various elevations.

PERRY H. HAMILTON.

REFERENCES CITED

The following references are of record in the file of this patent:

UNITED STATES PATENTS

| Number | Name | Date |
|--------|------|------|
| 373,306 | Ranney | Nov. 15, 1887 |
| 859,772 | Hoyt | July 9, 1907 |
| 1,198,639 | Hodny | Sept. 19, 1916 |